United States Patent [19]

Cremers et al.

[11] 4,051,026

[45] Sept. 27, 1977

[54] RECOVERY OF SILVER FROM SILVER-CONTAINING SOLUTIONS

[75] Inventors: Adrien Edgard Henri Julien Cremers, Winksele; Andre' Petrus Adolf Maes, Kessel-LO; Jozef Leonia Pleysier, Rijkevorsel, all of Belgium

[73] Assignee: Leuven Research & Development VZW, Leuven, Belgium

[21] Appl. No.: 626,052

[22] Filed: Oct. 28, 1975

[30] Foreign Application Priority Data

Oct. 29, 1974  Netherlands .......................... 7414149

[51] Int. Cl.$^2$ ............................................... C02B 1/42
[52] U.S. Cl. ..................................... 210/38 B; 423/24; 75/118 P
[58] Field of Search ........................ 210/24, 38 B, 36; 75/101 BE, 118 P; 423/24; 96/50 A, 61

[56] References Cited

U.S. PATENT DOCUMENTS

| | | | |
|---|---|---|---|
| 2,304,427 | 12/1942 | Sibley ........................................ 75/118 |
| 2,726,141 | 12/1955 | Appell ................................. 210/38 B |
| 3,725,259 | 4/1973 | Depree ................................ 210/38 B |
| 3,847,841 | 11/1974 | Motani ................................ 423/24 X |
| 3,892,688 | 7/1975 | Motani et al. ..................... 423/24 X |
| 3,892,689 | 7/1975 | Motani et al. ..................... 423/24 X |

FOREIGN PATENT DOCUMENTS

132,931  1949  Australia ............................... 75/118

*Primary Examiner*—Frank A. Spear, Jr.
*Assistant Examiner*—E. Rollins Cross
*Attorney, Agent, or Firm*—Snyder, Brown & Ramik

[57] ABSTRACT

Silver is recovered from silver-containing solutions such as waste waters from the photographic and electroplating industries, by treating such solutions with a cation exchanger in the presence of thiourea or thiourea derivatives. The cation exchanger may be selected from tectosilicates, phyllosilicates and organic cation exchangers.

13 Claims, No Drawings

RECOVERY OF SILVER FROM SILVER-CONTAINING SOLUTIONS

This invention relates to the recovery of silver from silver-containing solutions such as waste waters and extracts from hydrometallurgic industries.

Waste waters containing silver in dissolved state are produced in large quantities in the photographic and electroplating industries. Such silver-containing waste waters are provided e.g. by photographic fixation or stabilisation baths and by electrolytic silver-plating baths. Several methods, such as precipitation, ion exchange, reductive ion exchange and electrolytic recovery, have been used already for removing the dissolved silver from these waste waters. In general, such methods are quite efficient in the treatment of waste waters of relatively high silver content (e.g. 100 ppm or higher) but they become much less efficient in the treatment of waste water having a lower silver content (.e.g less than 100 ppm of silver). In addition, the presence of complexing agents, such as cyanides provided by the electroplating baths, may be interfering in some instances and may require a pre-treatment of the waste water if a precipitation method, e.g. with chlorides, is used.

The invention has for its object to provide a process which will allow to remove and recover smaller as well as larger amounts of dissolved silver from waste waters and other similar solutions.

The invention provides a process of recovering silver from silver-containing solutions, which comprises treating the solutions with a cationic exchange material in the presence of a thiourea material. This process is suitable for removing extremely small quantities of dissolved silver in an efficient way from the solutions, although the removal of larger quantities is possible in the same way.

Experiments that led to the invention have shown that the presence of thiourea in silver-containing water has a significantly synergistic effect on the adsorption of silver by cationic exchange materials. This fact resides probably on the formation of a silver complex of thiourea, such complex being absorbed easily then by the cation exchanger. In particular, it has been shown that the distribution coefficient of the silver-thiourea complex between the ion exchange material and the water is several orders of magnitude higher than the distribution coefficient of the silver ion alone. Therefore, silver may be removed quite easily from aqueous solutions at a yield of 99% or more, independently from the initial silver content of the solution, i.e. independent from the question whether this silver content was several grams or several milligrams per liter.

The invented process may be carried out on any type of aqueous solution which comprises silver in dissolved state. There is no need for limiting the silver concentration in such solutions. If desired, the major proportion of silver may be removed first from the solution by means of other processes such as precipitation, ion exchange, reductive ion exchange or electrolytic recovery, and thereafter the invented process may be effected for removing the remaining silver content.

In cases that the solution comprises complexing agents, such as cyanides (provided by an electrolytic bath) or thiosulfates (provided by a photographic fixation or stabilisation bath) in addition to silver, then these agents are also capable of forming complexes with the silver ion and such complexes will not be absorbed sufficiently by the cation exchanger. If thiourea is added to the solution next, then an equilibrium between silver-thiourea complexes and silver-cyanide or silver-thiosulfate complexes is formed and the silver cannot be absorbed totally by the ion exchanger. Therefore, it is preferred in such cases to remove the undesired complexing agents first, or to render them ineffective by means of dilution.

In some solutions, the silver is already partially present as a silver-thiourea complex. This thiourea is not interfering, of course, but its content will mostly be insufficient for the invented process, thus requiring an additional amount of thiourea to be added.

According to the invention, thiourea derivatives such as phenyl-thiourea, alkyl and aryl derivatives, or thiosemicarbazide, may be used in addition to or instead of thiourea itself. Therefore, the term "thiourea material" is used in this specification. This thiourea material may be added to the solution to be treated at any suitable moment but preferably, the addition is made shortly before contact with the cation exchanger.

During contact with the ion exchanger, the thiourea material should be present in excess towards to the silver in order to be sure of a good complexing reaction. The molar ratio of thiourea material to silver as present in solution should normally be at least 3:1 (i.e. a weight ratio of at least 2.5:1) because complications such as precipitation of AgS and the like would occur otherwise. An upper limit to the proportion of thiourea material cannot well be given since it will be dictated by economic and environmental considerations but preferably, a molar ratio of 5:1 (i.e. a weight ratio of 6.5 to 1) or more is used.

Regarding the cation exchanger, any organic or inorganic material having cation-exchanging characteristics, and any combination thereof, may be used. The inorganic cation exchangers will most likely be synthetic or natural tectosilicates and synthetic or natural phyllosilicates (clay minerals).

Typical examples of useful tectosilicates are ultramarines and zeolites, both synthetic (zeolite A, zeolite X, zeolite Y, zeolite L, zeolite $\Omega$) and natural (chabasite, erionite, elondite, mordenite). Typical examples of useful phyllosilicates are: attapulgite, vermiculite, montmorillonite, micas and hydromicas, kaolinite, asbest types. These ion exchangers may be used as such or admixed with conventional additives such as e.g. organic or inorganic granulation agents, agglomeration agents, dilution agents and binding agents.

Regarding the organic cation exchanger, all conventional exchange resins having sulfonic, carboxylic and other groups with ion-exchange capacities are suitable. Such resins are known by several trade names which are included herein by reference. Macroporous resins are preferred.

The actual choice of the cation exchangers depends from circumstances such as the silver content in the solution to be treated, the desired recovery yield and the ion exchange capacity of the exchanger. It is noted that the ion exchange capacity of the exchanger may vary from 0.1 to 10 meq/g for tectosilicates, from 0.1 to 2 meq/g for clay minerals and from 1 to 10 meq/g for organic cation exchangers. If the solution to be treated contains only small amounts of silver, e.g. 200 ppm silver or less, then ion exchangers of low capacity and ion exchangers of high capacity may be used both. In the case, however, that the solution to be treated comprises high amounts of silver, then it is preferred to use ion exchangers of high ion exchange capacity.

The amount of cation exchanger to be used is not critical. In general this amount will depend from the same factors as mentioned above, namely the amount of silver as present in aqueous solution, the desired recovery yield and the ion exchange capacity of the ion exchanger as used. In practice, amounts of 3 to 20 grams of cation exchanger per gram of silver, or more particularly 5 to 20 grams of inorganic ion exchangers and 3 to 10 grams or organic ion exchangers per gram of silver have been proved satisfactory.

The contact between cation exchanger and aqueous solution may be effected in any desired manner. Continuous contact as well as batchwise contact is possible.

If only small amounts of solution are to be treated (e.g. radiographic fixation baths from hospitals, developing and fixation baths of small photographers) then a simple column may be used and the solution may be passed continuously through this column.

If large volumes of liquid are available, then a discontinuous process (batchwise process) seems to be preferred. If the initial silver content therein is not higher than 50 ppm, then one single treatment may suffice. If the silver content is much higher than 50 ppm, then this silver content may be reduced to below 0.5 ppm by two consecutive treatments.

The liquid that has been subjected to the invented process only contains a fraction of the initial silver content (e.g. less than 1 ppm) and may be discarded to a sewage system or to surface water or may be processed further to recover other components.

The silver that has been bound to the cation exchanger during the process may be freed from that cation exchanger by treatment with substances that are capable of forming anionic or neutral (and preferably anionic) complexes with silver. Such substances are e.g. cyanides or EDTA (ethylenediamine tetra-acetate). First, the silver complex-loaded ion exchanger is liberated from an excess of treated solution by means of decantation, filtration or the like, followed or not followed by rinsing, and then the silver is set free by the addition of an anionic or neutral complexing agent, dissolved in water. The result is a concentrated silver solution wherein the silver is present as a complex. Thereafter, the silver may be recovered from this complex in a conventional way.

The invention is illustrated by the following examples:

EXAMPLE 1

A natural crystalline aluminosilicate identified as vermiculite (Yellow River Texas) was mixed with an aqueous solution containing 0.43 gram silver/liter and about 3 g thiourea/liter. The amount of vermiculite used was 17 g per gram of silver. After reaching an equilibrium, the silver concentration in the solution proved to be reduced to 0.9 mg/liter which corresponds to an efficiency of 99.8%.

EXAMPLE 2

The same material as specified in example 1 was mixed with an aqueous solution containing 0.65 g silver/liter and 4.6 g thiourea/liter. The amount of vermiculite used was 11.5 g/gram of silver. After reaching an equilibrium, the silver concentration in the solution proved to be reduced to 0.5 mg per liter which corresponds to an efficiency of 99.9%.

EXAMPLE 3

A synthetic aluminosilicate identified as zeolite X (Union Carbide) was mixed with an aqueous solution containing 54 mg silver/liter and 0.380 g thiourea/liter. The amount of zeolite used was 8.5 g/gram of silver. After reaching an equilibrium, the silver concentration in solution proved to be reduced to 0.54 mg/liter which corresponds to an efficiency of 99%.

EXAMPLE 4

The same material as specified in example 3 was mixed with an aqueous solution containing 108 mg silver/liter and 0.76 g thiourea/liter. The amount of zeolite used was 6 g/gram of silver. After reaching an equilibrium, the silver concentration in solution proved to be reduced to 1.2 mg per liter which corresponds to an efficiency of 99%.

EXAMPLE 5

A natural aluminosilicate identified as montmorillonite clay (from Camp Bertau, Morocco) was mixed with a typical effluent from a photographic industry containing 12 mg of silver/liter (and some complexing agents). The amount of clay used was 10 g per gram of silver and the thiourea concentration was adjusted to 80 mg/liter. After reaching an equilibrium, the silver concentration proved to be reduced to 0.57 ppm which corresponds to an efficiency of 95%.

EXAMPLE 6

Vermiculite was mixed with an aqueous solution containing 20 ppm of silver and 200 ppm of thiourea. The amount of vermiculite used was 17 or 20 g per gram of silver. After reaching an equilibrium the silver concentration in the solution proved to be reduced to respectively 0.5 (95.5% efficiency) and 0.06 ppm (99.7%). The equilibrium concentrations of silver in the absence of thiourea were respectively 13.4 and 12.4 ppm.

EXAMPLE 7

An organic ion exchanger (Lewatite-Na, Bayer) was mixed with an aqueous solution containing 10 ppm of silver and 780 ppm of thiourea. The amount of Lewatite used was 9.7 grams per gram silver. After reaching an equilibrium, the silver concentration proved to be reduced to 0.054 ppm which corresponds to an efficiency of 99.94%. In the absence of thiourea, the efficiency was 55%.

EXAMPLE 8

The same material as in example 7 was mixed with an aqueous solution containing 218 ppm of silver and 1550 ppm of thiourea. The amount of ion exchanger as used was 4.6 g per gram silver. After reaching an equilibrium, the silver concentration proved to be reduced to 0.45 ppm corresponding to an efficiency of 99.8%. In the absence of thiourea, the efficiency was 52%.

EXAMPLE 9

The same material as in example 7 was mixed with an aqueous solution containing 327 ppm of silver and 2340 ppm of thiourea. The amount of ion exchanger as used was 3 gram per gram of silver. After reaching an equilibrium, the silver concentration proved to be reduced to 0.6 ppm which corresponds to an efficiency of 99.8%. In the absence of thiourea, the efficiency was 52%.

What we claim is:

1. A process of recovering silver from silver-containing solutions, which comprises treating such solution with a cation exchanger in the presence of a thiourea material.

2. The process as claimed in claim 1, wherein said thiourea material is selected from the group consisting of thiourea, phenylthiourea, alkyl and aryl derivatives of thiourea and thiosemicarbazide.

3. The process as claimed in claim 1, wherein said thiourea material is used in a proportion such as to arrive at a molar ratio of at least 3:1 for thiourea material to silver in solution.

4. The process as claimed in claim 1, wherein said thiourea material is added to said silver-containing solution shortly before contact with said cation exchanger.

5. The process as claimed in claim 1, wherein said cation exchanger is selected from the group consisting of synthetic and natural tectosilicates and synthetic and natural phyllosilicates.

6. The process as claimed in claim 1, wherein said cation exchanger is an organic cation exchanger.

7. The process as claimed in claim 1, wherein said cation exchanger is used in a proportion of 3 to 20 grams per gram of silver as present in solution.

8. The process as claimed in claim 1, wherein said cation exchanger is contacted with a combination of said silver-containing solution and said thiourea material in a discontinuous way.

9. The process as claimed in claim 1 wherein after the aforesaid treatment, silver is recovered from said cation exchanger by treatment with substances capable of forming anionic or neutral silver complexes.

10. The process of recovering silver from silver-containing solutions, which comprises the steps of:
 a. forming silver-thiourea complexes in said solution by adding thiourea material thereto; and
 b. adsorbing said silver-thiourea complexes on a cation exchanger.

11. In a process for recovering silver from a silver-containing solution which comprises the steps of adsorbing the silver on a cationic exchange material and then recovering the silver from the cationic exchange material, the improvement which comprises:
 adding thiourea material to the silver-containing solution in amount sufficient synergistically to increase the amount of silver recovered.

12. In a process as defined in claim 11 wherein the thiourea material is added in amount of at least 3:1 molar ratio of thiourea material to silver.

13. In a process as defined in claim 12 which includes the step of rendering complexing agents such as cyanides and thiosulfates in said solution ineffective whereby said silver forms silver-thiourea complexes in said solution which are adsorbed by said cationic exchange material.

* * * * *